C. T. DOLLAHON.
Cotton-Scrapers and Thinners.
No. 149,923. Patented April 21, 1874.
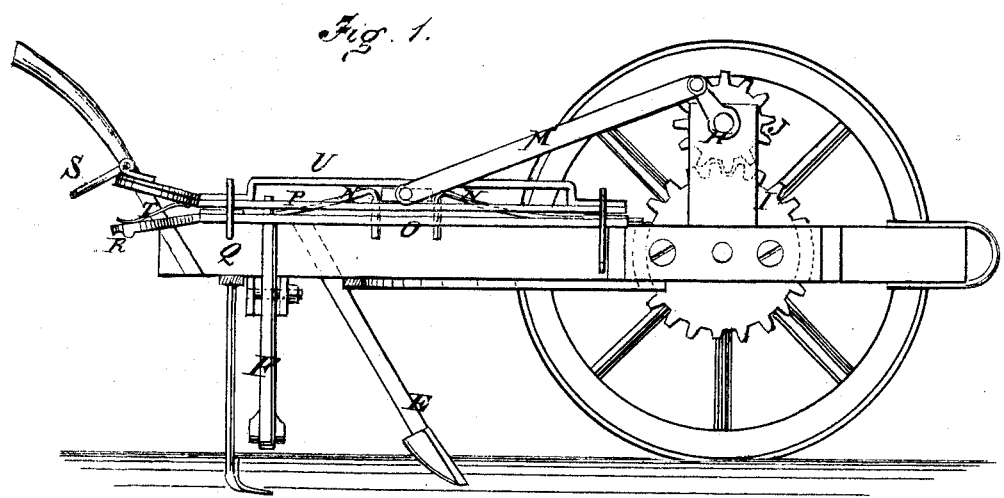
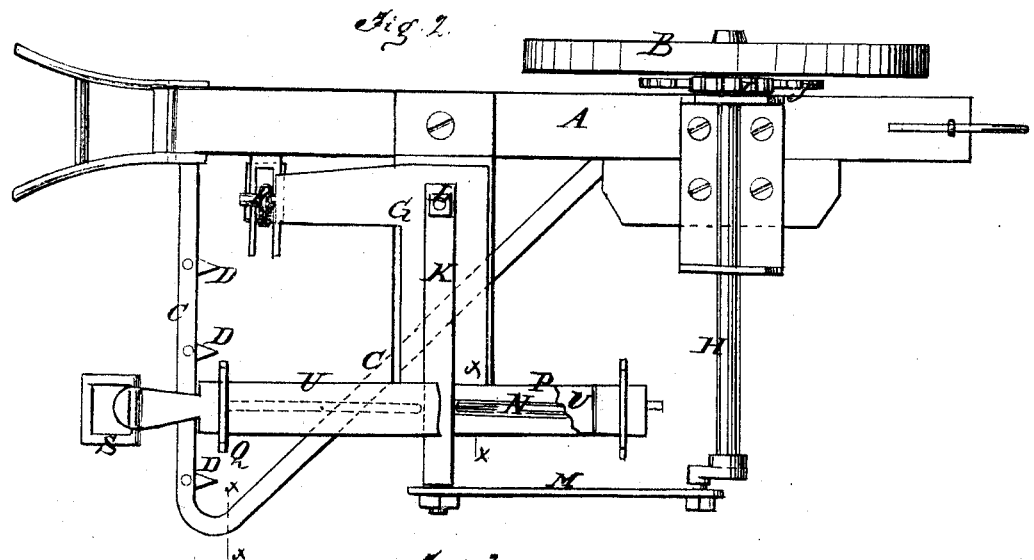
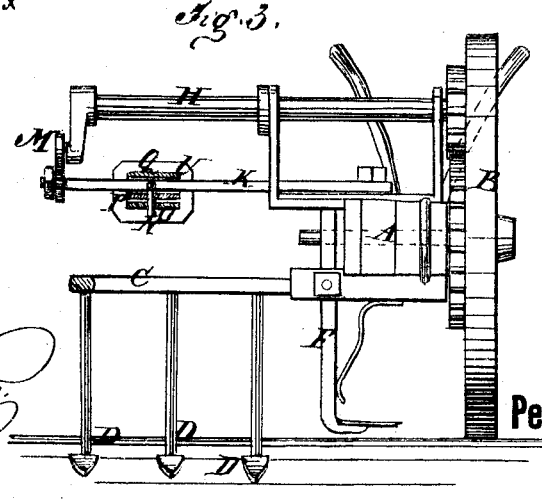
Witnesses.
Chas. Nida
Sedgwick
Inventor.
C. T. Dollahon
Per Munn & Co.
Attorneys.

UNITED STATES PATENT OFFICE.

CHARLES T. DOLLAHON, OF PITMAN, ARKANSAS.

IMPROVEMENT IN COTTON SCRAPERS AND THINNERS.

Specification forming part of Letters Patent No. 149,923, dated April 21, 1874; application filed January 10, 1874.

*To all whom it may concern:*

Be it known that I, CHARLES T. DOLLAHON, of Pitman, in the county of Randolph and State of Arkansas, have invented a new and Improved Cotton Scraper and Thinner, of which the following is a specification:

My invention consists of a master-wheel, the axle of which is mounted on the left-hand side of the beam, from which a bar extends to the rear end and supports a number of cultivators for cultivating the right-hand side of the row, while the wheel runs along the left-hand side, and is followed by a scraper on that side, and a shaft geared with the master-wheel extends across to the left-hand side, and has a crank at that end connected with a horizontal elbow-lever, which works a chopper, and causes it to chop out portions of the row at certain distances apart. The elbow-lever is connected with the crank by contrivances arranged so that it can be thrown out of gear and remain inoperative while the machine is running along one side of the row, as it is only necessary for it to work during one passage of the scrapers, while they are required to run twice along the row, once on each side.

Thus the machine scrapes off on one side, cultivates on the other, and chops out, all at the same time, and by running both up and down the row scrapes off and cultivates both sides in a very efficient manner, calculated to economize labor and facilitate the work.

Figure 1 is a side elevation of my improved machine. Fig. 2 is a plan view; and Fig. 3 is partly a front elevation and partly a transverse section, the latter being taken on the lines *x x*.

Similar letters of reference indicate corresponding parts.

A represents the beam; B, the master-wheel; C, the projecting frame at the right-hand side; D, the cultivators, mounted on said frame E, the scraper on the left-hand side; F, the chopper; G, the elbow-lever; H, the crank-shaft, and I and J the gears for working said crank-shaft. The elbow-lever carries a bar, K, which is pivoted to it at its axes of motion, L, so that it can turn without causing the lever to work, and said lever is connected to the crank-shaft by the rod M and the wire spring-catches N, the latter being connected to a plate, O, which is so connected to one end of the elbow-lever that when the bar K is confined between said catches, as represented in the drawings, the said lever will be caused to vibrate so as to work the chopper; but the plate O is pivoted to the plate P, above which the arm K works at Q, so that by raising the end R and securing it by the yoke S, the spring-catches will be thrown down below the plate P, so as to release the bar, when it will swing forward and back on plate P, and the elbow-lever will remain at rest. A spring, T, is arranged with the plate O and P outside of the pivot Q, so that it keeps the spring-catches up in the position represented in Fig. 1, to confine the bar K between them. These spring-catches are so arranged that whenever the yoke S is disconnected from the extension R of plate O and the spring T allowed to act, the bar K will come into its place between the two springs, no matter where it happens to be at the time, by pressing them down and passing over them. A guard, V, is arranged a little above the plate P, to keep the bar in place upon said plate P, and said plate P is connected to the elbow-lever. The gears I J will be so adjusted as to size that they will cause the chopper to cut out the row at intervals of any required distance apart, to suit the custom of the locality where the machine is to be used.

Having thus described my invention, I claim as new and desire to secure by Letters Patent—

1. The combination and arrangement of beam A, master-wheel B, frame C, cultivators D, scraper E, and chopper F, all substantially as described.

2. The combination with the chopping mechanism, constructed substantially as described, of the bar K, spring-catches N, bars O and P, yoke S, spring T, and guard V, with elbow-lever G and the connecting-rod M, substantially as specified.

CHARLES T. DOLLAHON.

Witnesses:
JOHN B. PATTERSON,
JOSHUA MARTIN.